March 26, 1963  G. C. SUMMERS  3,082,837
ACOUSTIC BORE HOLE LOGGING SYSTEMS AND APPARATUS
Filed Dec. 15, 1959  2 Sheets-Sheet 2
*Fig. 4*
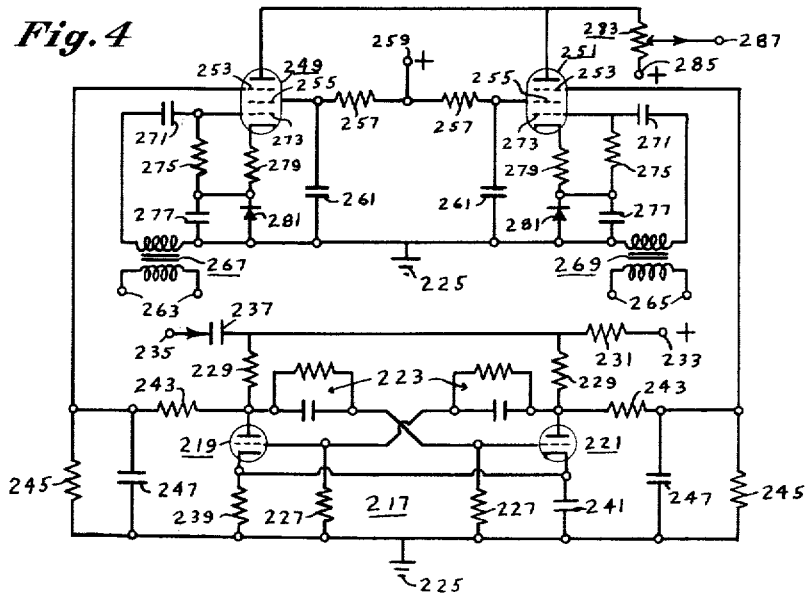
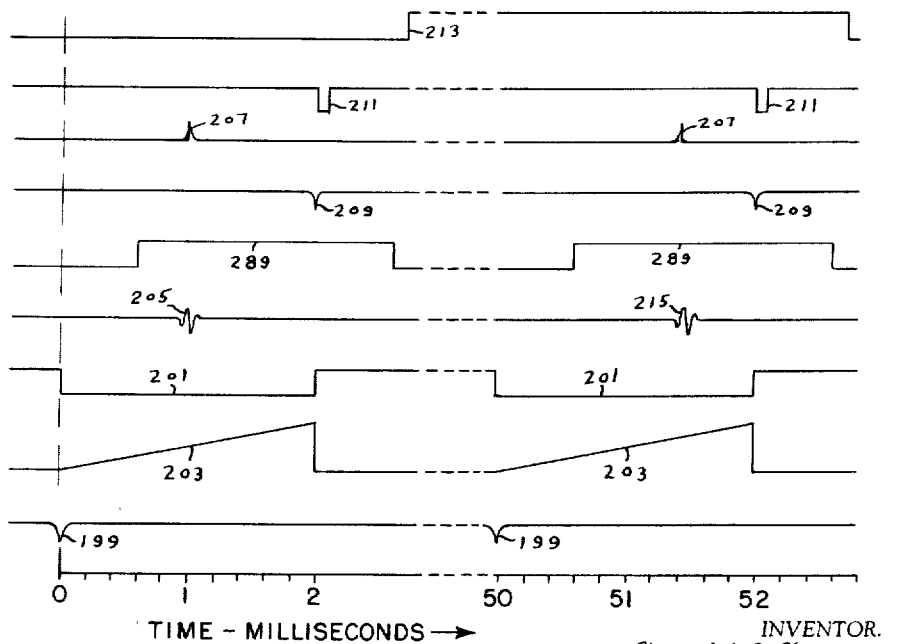
TIME – MILLISECONDS →
*Fig. 5*
INVENTOR.
Gerald C. Summers
BY
Wm. T. Wofford
Attorney

United States Patent Office 3,082,837
Patented Mar. 26, 1963

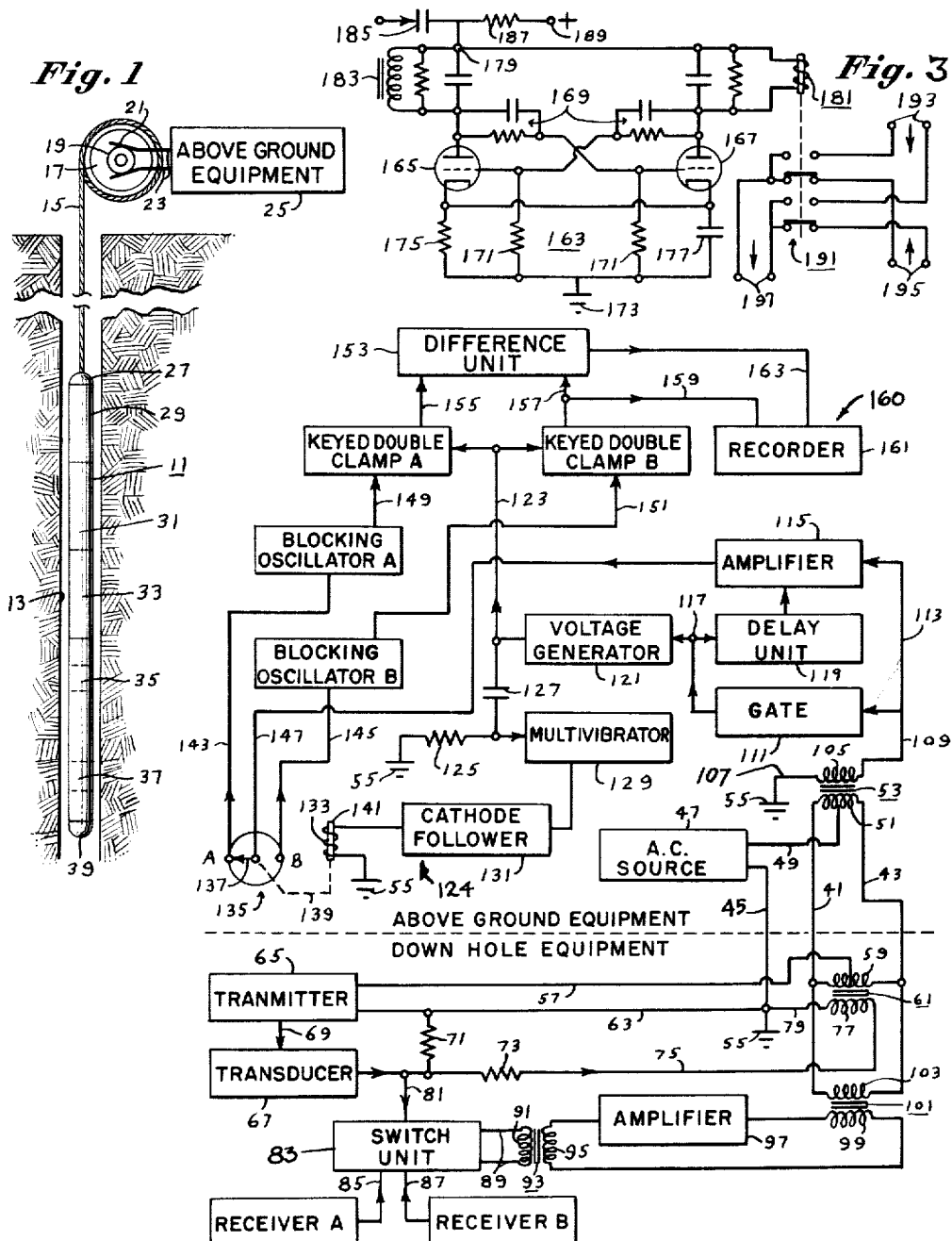

3,082,837
ACOUSTIC BORE HOLE LOGGING SYSTEMS AND APPARATUS
Gerald C. Summers, Dallas, Tex., assignor, by mesne assignments, to PGAC Development Company, Houston, Tex., a corporation of Texas
Filed Dec. 15, 1959, Ser. No. 859,696
11 Claims. (Cl. 181—.5)

My invention relates to improved systems and apparatus for measurement and logging of compressional wave energy in earth formations, and more particularly to measurement and logging of elastic impulses or waves through earth formations adjacent the walls of a bore hole.

The general object of the present invention is to provide an improved receiver output switching system, arrangement, and apparatus.

Another object of my invention is to provide a receiver output switching system which will make possible the simplification of acoustic logging apparatus.

Another object of my invention is to provide a receiver switching system having the characteristics of improved reliability and effectiveness.

Another object of my invention is to provide a logging system wherein receiver output selection is accomplished entirely by down hole equipment.

These and other objects are effected by my invention, as will be apparent from the following description, taken in accordance with the accompanying drawings, forming a part of this application, in which;

FIG. 1 is a diagrammatic showing of a general layout of a bore hole logging system in which my invention may be utilized with the downhole logging instrument of the system being illustrated in position within a borehole traversing a fragmentary section of the earth's surface;

FIG. 2 is a schematic circuit diagram showing an improved velocity logging system in accordance with a preferred embodiment of my invention;

FIG. 3 is a schematic circuit diagram showing details of the switch unit shown in block form by FIG. 2, in accordance with one embodiment of the invention;

FIG. 4 is a schematic circuit diagram showing details of the switch unit shown in block form by FIG. 2, in accordance with another embodiment of my invention; and, FIG. 5 is a graph showing a plurality of wave forms to aid in explanation of the invention.

Referring now to the drawings, there is shown in FIG. 1 a logging instrument assembly 11 lowered into a bore hole 13 by means of a cable 15, which is reeled off a conventional cable drum 17, which is powered and controlled by conventional means (not shown). The cable 15, in addition to supporting the instrument assembly 11, has a plurality of conductors insulated from each other and from the outer sheath. The cable drum shaft is provided with a plurality of slip rings 19, with associated brushes 21, through which electric signals are transmitted to or from the cable conductors and via the conductors 23 to components of above ground equipment, indicated generally by the block 25. The sections of the down hole instrument assembly, as shown by FIG. 1, may include, by way of illustration, reading from top to bottom, a cable head 27, an amplifier and control section 29, an acoustic energy transmitter 31, a transmitter transducer 33, an acoustic receiver section including two receivers, 35, 37, and a nose piece 39. The components of the down hole instrument assembly are each built into a length of heavy pipe provided with threaded coupling devices at its ends, as well as suitable electric connector devices. The cable 15 is fixed at its lower end to the cable head 27, which is coupled at its lower end to the uppermost instrument component 29.

In FIG. 2 there is shown an acoustic velocity logging system embodying the principles of my invention. The instrument assembly (down hole equipment) is connected via a conventional two conductor plus armor cable, the conductors being hereinafter referred to as the first and second conductors, 41, 43, and the armor as the return conductor 45.

Power is supplied from a conventional alternating current source 47 above ground via one lead 49 connected to the balanced center tap of the secondary winding 51 of a first transformer 53, the free ends of the secondary winding 51 being connected respectively to the first and second cable conductors 41, 43. The other lead from the power source 47 is connected through the return conductor 45 to ground at 55. Power is taken off down hole via one transmitter input lead 57 which is connected to the balanced center tap of the secondary winding 59 of a second transformer 61, the free ends of the secondary winding 59 being connected respectively to the first and second cable conductors 41, 43, and the other transmitter input lead 63 being connected to the cable return conductor 45. Thus, power is supplied down hole by a phantoming arrangement which is well known in the art, the first and second cable conductors 41, 43 being effectively in parallel for the power frequency.

The transmitter 65 may be a conventional type freerunning high-power pulse source, such as described in U.S. Patent 2,737,639. Application of power causes the transmitter to emit pulses at a suitable repetition rate, for example, in the range of 15 to 30 pulses per second. These pulses drive a transducer 67 which is connected to the transmitter 65 via output lead 69, thus forming means for generating a train of acoustic or elastic impulses which are coupled by the drilling fluid to formations adjacent the bore hole. The transducer 67 may be of a conventional type, such as described in U.S. Patent 2,722,282. A small portion of the voltage pulse from the transmitter 65 is developed across a first resistor 71 which is connected in series with lead 63 to the return conductor 45. This voltage is applied through a series resistor 73 via lead 75 to one terminal of the primary winding 77 of the second transformer 61, the other terminal being connected via lead 79 to the return conductor 45, which is grounded at 55. This small voltage is generated once for each transmitter pulse and is hereinafter called the transmitter synchronizing pulse. Thus, the series of small pulses form a train of synchronizing pulses which are sent up to the above ground equipment, balanced by the second transformer 61 via the first and second cable conductors 41, 43. Each transmitter synchronizing pulse is also fed via lead 81 to the input of a switch unit or switch means 83. This switch means constitutes a salient feature of my invention, as will be hereinafter more fully explained.

As hereinbefore mentioned, the down hole instrument assembly in the system of FIG. 2 carries two receivers, hereinafter referred to respectively as receivers A and B. The receivers A and B may be of identical conventional types which function to convert impinging acoustic energy into electric signal form. The outputs of receivers A and B are connected respectively via leads 85 and 87 to the input of the switch means 83. The output of the switch means is connected via leads 89 to the primary winding 91 of a first isolation transformer 93. The secondary winding 95 of the first isolation transformer 93 is connected in series with a first amplifier 97 and the primary winding 99 of a second isolation transformer 101, the secondary winding 103 of which is connected across the first and second cable conductors 41, 43.

The primary winding 105 of the first transformer 53 has one side connected to ground via lead 107 and the other side is connected via lead 109 to the input of a gate 111, and also via lead 113 to the input of a second amplifier 115. The transmitter synchronizing pulse is utilized to trigger the gate 111, which may be of a conventional type such as that described in my Patent Re. 24,446. The output terminal 117 of the gate 111 is connected to a delay unit 119, and to a voltage generator 121. The output of the delay unit 119 is connected to the second, or above ground, amplifier 115. The delay unit 119 may be of a conventional type, which functions to delay application of the gate output to turn on the second amplifier 115 until after the synchronizing pulse has passed, thus insuring that the second amplifier output will contain no component of the synchronizing pulse. The voltage generator output is connected to the respective inputs of keyed double-clamp units A and B via lead 123. The voltage generator 121 may be of a type which is capable of generating a precision saw tooth wave form, such as the voltage generator described in U.S. Patent Re. 24,446. The keyed double-clamps A and B may each be like the one described in Re. 24,446 and designated generally therein by reference numeral 32. The voltage generator output is also connected to switch means 124 in the above ground equipment for switching the output of the amplifier 115 to a pair of blocking oscillators A and B in sequence. The switch means 124 is effective to connect the outputs of the downhole receivers A and B to the blocking oscillators A and B, respectively, in the manner described more fully below. The switch means 124 includes a differentiating network comprising a resistor 125 and capacitor 127 which receives the output of the voltage generator 121 and supplies a pulse signal developed therefrom to the input of a mono-stable multi-vibrator 129. The differentiating network functions to generate a sharp negative pulse at the end of each voltage generator cycle, which pulse serves to trigger the multi-vibrator 129. The multi-vibrator 129 may be identical in form to the gate 111, except that it may have different time constants. The multi-vibrator output is connected to the input of a conventional cathode follower 131. The cathode follower output is connected in series with the coil 133 of a solenoid actuated stepping switch 135, to ground at 55. The stepping switch 135 has a pair of fixed contacts A, B, located 180° apart, and a movable contact 137 which sweeps the respective fixed contacts A, B, in sequential succession. The movable contact 137 is actuated by means of a mechanical linkage 139 and ratchet mechanism (not shown) which is connected to the solenoid armature 141. The movable contact 137 moves one step each time the solenoid is actuated. Stepping switch fixed contact A is connected via lead 143 to the input of blocking oscillator A, while the stepping switch fixed contact B is connected via lead 145 to the input of a blocking oscillator B. The movable contact 137 of the stepping switch 135 is connected via lead 147 to the output of the second amplifier 115. Thus, switch means 124 includes the differentiating network 125, 127, the multivibrator 129, the cathode follower 131, and the stepping switch 135 and this switch means is utilized to apply the output of the second amplifier 115 successively to the respective blocking oscillators A and B. The blocking oscillators A and B may be of a conventional type, such as that described by Re. 24,446 and designated generally by reference numeral 31 therein. The outputs of blocking oscillators A and B are connected via leads 149 and 151 to respective keyed double-clamps A and B. The blocking oscillator outputs function to control the keyed double-clamps, as will be hereinafter more fully explained. The respective outputs of the keyed double-clamps, as will be hereinafter more fully explained, are direct current voltages which have magnitude proportional to the time interval between a transmitted pulse and the first arrival of corresponding acoustic energy at a respective receiver. Each keyed double-clamp output could be recorded as a single receiver log. However, because of well known advantages of dual receiver logs, a difference unit 153 is provided. The difference unit will have an output proportional to the difference (algebraic sum) of the two applied voltages. The difference unit 153 may be a conventional differential amplifier. The output of keyed double-clamp A is connected via lead 155 to one input of the difference unit, while the output of keyed double-clamp B is connected via lead 157 to another input of the difference unit, and also via lead 159 to an input of a suitable recorder. The output of the difference unit is connected via lead 163 to another input of the recorder 161. The recorder may be any suitable device for measuring and recording or indicating variations in the magnitude of its respective inputs. It may, for example, be a conventional potentiometer type strip chart recorder. The recorder 161, its associated difference unit 153, the keyed double clamps A and B, the voltage generator 121 and the blocking oscillators A and B cooperate to form measuring means 160 for making acoustic velocity measurements in response to signals from the receivers A and B in the downhole instrument. The blocking oscillators A and B form first and second input circuits, respectively, for the measuring means 160.

As hereinbefore mentioned, the provision of a switch unit or switch means in the downhole instrument to accomplish receiver selection independent of signals from the above ground equipment is a salient feature of my invention. Heretofore, it has been believed necessary and desirable to accomplish receiver selection responsive to signals derived from the above ground equipment, so that receiver switching could be stopped or started at will. However, I have found that receiver selection can be accomplished with improved reliability and effectiveness by an arrangement which utilizes the synchronizing pulse direct from the transmitter downhole. With such an arrangement, above ground equipment can be simplified, the number of transmission cable conductors can be reduced, and all potential difficulties involved in transmission of a switching signal from above ground to downhole equipment are eliminated.

There are a number of possible types of switch means that could be utilized in the practice of my invention. One switch means which has been found satisfactory is the electro-mechanical relay type switch means, shown by FIG. 3 of the drawings. Another switch means which has proven satisfactory is the electronic type unit shown by FIG. 4 of the drawings. In cases where more than two receivers are employed, then a ring counter type switch unit of the general type described in Pulse and Digital Circuits at sec. 11–9, page 343, by Millman and Taub, 1956 edition, published by McGraw-Hill Co., may be used. Successive transmitter synchronizing pulses would be applied to the input of the ring counter, as its multiple outputs would each actuate electro-mechanical or electronic relays in predetermined repeated sequence, and the relays would function to select appropriate receiver outputs. An identical ring counter or multiple stepping switch would be provided for the above ground equipment.

The switch means shown by FIG. 3 comprises a bi-stable multivibrator 163 having a pair of triodes 165, 167, with the plate of one being connected in series with a paralleled resistor and capacitor 169 to the grid of the other; their cathodes connected together; grid resistors 171 connected to ground 173; a cathode resistor 175 connected to ground 173 for one triode 165 and a cathode capacitor 177 connected to ground for the other triode 167. The multi-vibrator 163 as thus far described is a conventional type such as is commonly used in binary scaling. However instead of the usual plate load resistors, there is connected between the plate of one triode 167 and the multi-vibrator input terminal 179 a relay 181, and there is connected between the plate of the other triode 165 and the input terminal 179 a dummy relay 183. The purpose of the dummy relay is to make both triode plate circuits look alike to the multi-vibrator trigger pulse, so that the multi-vibrator will be triggered as readily into either of its stable states. The trigger pulse is coupled to the multi-vibrator input terminal 179 by means of a capacitor 185. The multi-vibrator input terminal 179 is connected in series with a voltage dropping resistor 187 to the positive terminal 189 of a power source (not shown). The relay 181 is thus energized upon application of one trigger pulse and de-energized upon application of the next trigger pulse. The relay armature actuates contacts which are arranged and connected to act as a double pole double throw switch 191. The double pole double throw switch has two sets of input terminals 193, 195 and one set of output terminals 197. The switch 191, of course, acts to connect one set of input terminals 195 to the output terminals 197 when the relay is de-energized, and to connect the other set of input terminals 193 to the output terminals 197 when the relay 181 is energized. To connect the switch unit of FIG. 3 into the system of FIG. 2, the multi-vibrator input would be connected via lead 81 so as to receive the transmitter synchronizing pulse; receiver A output would be connected to one set of relay input contacts 195, while the output of receiver B would be connected to the other set of relay input contacts 193; and the relay output contacts 197 would be connected in series with the primary winding 91 of the first isolation transformer 93.

The operation of the logging system of FIG. 2 will now be described, using the switch unit of FIG. 3. Each time the transmitter 65 fires, an acoustic impulse is put out by the transducer 67. At the same time, a small portion of the transmitter pulse energy is taken as the synchronizing pulse which is developed across resistor 71 and transmitted to above ground via the first and second cable conductors 41, 43, and taken off at the primary winding 105 of the first transformer 53 and fed via conductor 109 to the gate 111. The transmitter synchronizing pulse is also fed via lead 81 to the input terminal of the switch unit 83.

In a typical case, the transmitter 65 may fire at the rate of approximately twenty times per second, giving a time interval between successive acoustic impulses (and also transmitter synchronizing pulses) of about fifty milliseconds. The acoustic energy which leaves the transmitter transducer 67 will travel in many modes through the drilling fluid and the formations adjacent the bore hole, and portions of it will arrive at receivers A and B, with the arrival time in each case depending upon the specific mode, the nature of the medium through which it travels, and the spacing of the respective receiver from the transmitting transducer. The velocity of sound in earth formations ranges from about 5,000 to 30,000 feet per second, or at the rate of 200 to 33.3 microseconds per foot of travel. Since sound will travel faster in the earth formations than in the drilling fluid, first arrival energy at each receiver will always be from the formation. Acoustic energy arriving at each receiver persists over a period of many microseconds, but only the first arrival of acoustic energy at each receiver is of interest in the acoustic logging systems disclosed herein. If, as is usual, minimum spacing from the transmitter 65 to the near receiver (A) is five feet, then the time interval between the transmitted impulse and first received energy at the near receiver A will range from about 0.165 to 1.0 millisecond. With, as is usual, the spacing between the transmitter and the far receiver being eight feet, then first arriving energy at the far receiver (B) will never arrive later than 1.6 milliseconds after the transmitted impulse. Thus, a time interval extending from 0.165 to 2 milliseconds after each transmitter impulse will encompass all possible desired receiver signals. It is desirable to accomplish receiver switching within the unused time interval between time 0+2 milliseconds and the next transmitter pulse (0+50 milliseconds). A large switching transient within this unused time interval will cause no harmful effects. The sequence of events for a cycle of operation of the system may be followed by reference to FIGURES 2, 3, and 5. Assume that at time 0 the transmitter 65 fires, putting out a synchronizing pulse indicated at 199 in FIG. 5, and at this time the multi-vibrator 163 of FIG. 3 is in the stable state wherein the relay 181 is de-energized so that output of receiver A is connected to the switch unit output terminals 197. Assume also that the transmitter synchronizing pulse arrives at the gate 111 at time 0. The gate is a monostable multi-vibrator, the output of which is indicated at 201 in FIG. 5. The gate 111 opens at the time 0 and closes at the time 2. The gate serves two functions. It acts to turn on the voltage generator 121 and the second amplifier 115. Thus, at time 0, the voltage generator 121 begins to generate its precision saw tooth wave form, which is indicated at 203 in FIG. 5. The gate output is applied to the second amplifier 115 through the delay unit 119, which acts to turn on the second amplifier only after sufficient time has elapsed for passage of the synchronizing pulse, so that the amplifier 115 is blocked, insofar as the synchronizing pulse is concerned.

Acoustic energy from the transmitted pulse will arrive first at receiver A, since it is closest to the transmitting transducer. Energy arriving at receiver A will be transmitted through the switch means 83, via the first amplifier 97 and the first and second cable conductors 41, 43, to above ground, where it is taken from the primary winding 105 of the first transformer 53 via leads 109 and 113 to the input of the second amplifier 115. The received signals do not affect the gate 111, since it has already been triggered. The received signal will be passed by the amplifier 115 because it arrives at the amplifier after it has been turned on by the delay unit 119. The gate signal as seen by the amplifier is indicated at 289 in FIG. 5. The receiver energy which arrives at the second amplifier 115 is indicated at 205 in FIG. 5. The second amplifier output is conducted via lead 147 and through contact A of the stepping switch and via lead 143 to the input of blocking oscillator A. Blocking oscillator A functions upon application of an input signal to generate a sharp output pulse. This output pulse is indicated at 207 in FIG. 5. It should be noticed that blocking oscillator A functions immediately upon arrival of a signal, and so produces its output pulse at a time (e.g. 0+1), which represents arrival of first received energy from receiver A. The output pulse from blocking oscillator A is conducted via lead 149 to the control input of keyed double clamp A. As hereinbefore mentioned, reference is made to the keyed double clamp designated by reference numeral 32 in my patent Re. 24,446 for a detailed explanation of a suitable keyed double clamp. It will suffice here to say that the output of keyed double clamp A is a direct current voltage of magnitude dependent upon the magnitude of the voltage generator output (degree of rise of the saw tooth wave form) at the instant of application of the output pulse of blocking oscillator A (time 0+1 in FIG 5). The magnitude of the keyed double clamp output is adjusted each time it receives a control pulse. Thus, the output voltage of keyed double clamp A is proportional to the time interval between the transmission of an acoustic energy impulse from the transmitting transducer 67 and the receipt of first acoustic energy from that impulse at receiver A (when corrected for the travel time of the sygnchronizing pulse from the transmitter to the gate). During the time interval between successive control signals, the output of the keyed double clamp A remains constant.

Now at the end of the cycle of the precision saw tooth generated by the voltage generator (the time at which the wave form returns suddenly from peak magnitude to initial magnitude, which is time 0+2 in FIG. 5), due to the rapid rate of change of magnitude of the saw tooth wave form, the differentiating network 125, 127 will produce a sharp negative pulse. This negative pulse, indicated at 209 in FIG. 5, triggers the multi-vibrator 129, causing it to generate an output pulse which is indicated at 211 in FIG. 5. The multi-vibrator ouput pulse is fed through the cathode follower 131 to cause energization of the solenoid coil 133 of the stepping switch 135, so that its movable contact 137 steps to close on fixed contact B.

It will be recalled that at a time 0 the transmitter synchronizing pulse is also fed to the input of the switch unit 83, or in the case of FIG. 3, to the multi-vibrator trigger input terminal 179. Before application of this trigger pulse (under the assumed conditions), the multi-vibrator 163 was in that stable state in which the triode 165 associated with the dummy relay 183 was conducting and the triode 167 associated with the switching relay 181 was cut off, so the relay 181 was de-energized, with its contacts in position such that the output terminals of receiver A were connected to the primary winding 91 of the first isolation transformer 93. Now immediately upon application of the transmitter synchronizing pulse (time 0), the multi-vibrator 163 is triggered to its other stable state, wherein the triode 167 associated with the switching relay 181 is conducting. However, action of the relay 181, it being a slow acting mechanical device, is slow enough that the output of a respective receiver, subsequent to each firing of the transmitter 65, is measured by the above ground equipment before actual relay operation occurs. (A relay action delay time of about 2 milliseconds is all that is necessary.) In the assumed case, the relay switching occurs approximately at time 0+2.7 milliseconds, as indicated at 213 in FIG. 5. Since at this time there are still many milliseconds of unused time remaining before the next transmitter firing (at 0+50), even a large switching transient can be tolerated. After the switching action has occurred in the assumed case, the output of receiver B is then connected to the primary 91 of the first isolation transformer 93. The system is now ready for the next synchronizing pulse, which is produced by the next firing of the transmitter (time 0+50 in FIG. 5), at which time the system will respond as before, except that it will operate on acoustic energy arriving at receiver B (indicated at 215 in FIG. 5). One cycle of system operation is thus completed. It is apparent that the system will sample the output of a given receiver on alternate transmitted acoustic impulses. Each time the output of a given receiver is sampled, the corresponding keyed double clamp will adjust its output to correspond to the new time interval between the transmitted impulse and first arriving energy at the respective receiver.

Relays utilized in down hole equipment sometimes present difficulties due to their development of high resistance contact conditions, especially when the equipment is operated in hot wells. It therefore may be desirable to utilize an all electronic switching means. Such a means, or switch unit, is shown by FIG. 4.

In FIG. 4 there is shown a conventional type bi-stable multi-vibrator 217 comprising first and second triodes 219, 221. The plate of each triode is connected in series with a respective paralleled resistance capacitor network 223 to the grid of the other triode. The grid of each triode is connected to ground at 225 through a respective series grid resistor 227. The plate of each triode 219, 221, is connected through a respective plate load resistor 229 and a common voltage dropping resistor 231 to the positive terminal 233 of a plate voltage source (not shown). The input terminal 235 of the switch unit which receives the switch trigger pulse (transmitter synchronizing pulse for the system of FIG. 2) is connected through a coupling capacitor 237 to the junction of the plate load and plate voltage dropping resistors 229, 231. The cathodes of the triodes 219, 221 are connected together, and the cathode of one triode 219 is connected through a cathode resistor 239 to ground, while the cathode of the other triode 221 is connected through a cathode capacitor 241 to ground 225. A respective voltage divider network is connected between the plate of each triode 219, 221 and ground 225. Each voltage divider network is made up of a first resistor 243 having one terminal connected to the triode plate and in series with a second resistor 245 which has its free terminal connected to ground 225. A respective time delay capacitor 247 is connected across each second resistor 245. There is a pentode associated with each triode of the multi-vibrator 217, designated for convenience as the left hand pentode 249 associated with the left hand triode 219, and the right hand pentode 251 associated with the right hand triode 221. The suppressor grid 253 of a respective pentode is connected to the junction of the resistors 243, 245 of the respective voltage divider network. The screen grid 255 of each pentode is connected through a respective resistor 257 to the positive terminal 259 of a direct current voltage supply source (not shown). The screen grid 255 of each pentode is also connected through a respective capacitor 261 to ground 225. A set of input terminals 263, 165 is associated with each pentode 249, 251. Each set of input terminals (which correspond to the input terminals of the switch unit for the system of FIG. 2) is connected in series with the primary of a respective input transformer 267, 269, the secondary of which has one terminal connected to ground 225 and the other terminal connected in series with a respective coupling capacitor 271 to a respective pentode control grid 273. Grid and cathode bias is provided for each pentode 249, 251 by a respective network including a first resistor 275 having one terminal connected to the respective control grid 273 and the other terminal connected in series with a respective bias capacitor 277 to ground 225, and a second resistor 279 having one terminal connected to a respective pentode cathode and the other terminal connected to the cathode terminal of a respective Zener diode 281, the anode terminal of which is connected to ground 225. The junction of the respective first resistor 275 and bias capacitor 277 is connected to the junction of the respective second resistor 279 and Zener diode 281. The pentode plates are connected together and in series with the fixed resistance of potentiometer 283 to the positive terminal 285 of a direct current power supply source (not shown). The output of the switching device is taken at terminal 287, which is connected to the potentiometer movable contact, and which corresponds to the output of the switch unit 83 in the system of FIG. 2.

Assume now that the arrangement of FIG. 4 is utilized as the switch unit 83 in the system of FIG. 2. A negative trigger pulse (the transmitter synchronizing pulse) would be applied to the input terminal 235 of the device at time 0 (see FIG. 5). This pulse is coupled to both multivibrator triode grids via the coupling capacitor 237 and resistor-capacitor networks 223, 229. Assume that receiver A output is connected to the left hand input terminals 263 in FIG. 4 and receiver B output is connected to right hand input terminals 265 in FIG. 4. Assume also that prior to application of the trigger pulse at time 0, the multi-vibrator 217 is in that stable state wherein the right hand triode 221 is conducting. Since only the conducting tube of a bi-stable multi-vibrator is affected by application of a negative trigger pulse, the multi-vibrator 217 will be immediately triggered to the state wherein the left hand triode 219 is conducting, upon application of the transmitter synchronizing pulse. Now the plate voltage of the right hand triode 221 which is now cut off has risen to a higher level, and the plate voltage of the left hand triode 219 which is now conducting has fallen to a lower level. These voltage changes are direct current coupled into the suppressor grids 253 of the pentodes 249, 251 by means of resistors 243, 245. The resistor values 243, 245 are chosen such that when a respective triode is cut off, its associated pentode is turned on and is able to amplify any signal which is applied to its control grid. Conversely, when a respective triode is conducting, then its associated pentode is cut off and cannot amplify or pass signals applied to its control grid. Now by use of time delay condensors 245 of suitable value, the voltage change as applied to a respective pentode suppressor grid is delayed by at least two milliseconds, so that actual switching may occur at, for example, time 0+2.70 milliseconds, as indicated at 213 in FIG. 5. Thus, in the assumed case, any output of receiver A could be amplified by its associated pentode 249 during the time interval between 0 and 0+2.70 milliseconds; and then any output of receiver B could be amplified by its associated pentode 251 until occurrence of the next switching action. In order to avoid use of batteries or the need for a negative power source, Zener voltage reference diodes 281 are used in the pentode cathode circuits, so that the cathodes are biased positively to a level such that the suppressor grids 253 rest below the cathodes during the low plate voltage level states of the triodes 219, 221 sufficiently to cut off the respective pentodes 249, 251.

As has been hereinbefore mentioned, a time interval extending from 0.165 to 2 milliseconds following each transmitter pulse will encompass all possible desired received signals. It is desirable that no extraneous noises or impulses be introduced into the logging system during this time interval, but provisions in the system make it immune to disturbances at any other time. Both the switch units of FIGURES 3 and 4 herein described accomplish receiver selection or switching after at least 2 milliseconds following a transmitted impulse.

Now, if desired, the arrangement of FIG. 4 could be used, by eliminating the time delay capacitors 247 to accomplish receiver switching immediately upon application of the transmitter synchronizing pulse. Since electronic switches act quickly (in times of 10 microseconds or less) the switching could be accomplished between time 0 (time of transmitter synchronizing pulse) and 0+0.165 milliseconds. However, electronic switches are prone to have at their outputs large transients incidental to the switching action but not related to the signals being switched. Consequently, if the switching is done immediately upon application of the transmitter synchronizing pulse, then additional precautions would probably be necessary to avoid harmful effects of the switching transients.

It will be apparent from the foregoing that I have provided an improved acoustic logging system wherein receiver output selection is accomplished entirely by down hole equipment indepedently of above ground equipment. Although I have shown and described my invention in connection with its use in a two receiver logging system, the invention is also applicable to logging systems which may employ more than two receivers. The invention is also applicable to logging systems other than the specific one shown by FIG. 2 of the drawings. Further, in its broad aspects, the invention may utilize specific switching units other than the ones shown by FIGURES 3 and 4 of the drawings.

The foregoing disclosure and the showings made in the drawings are merely illustrative of the principles of my invention, and are not to be interpreted in a limiting sense.

I claim:

1. A system for measuring the acoustic velocity of earth formations adjacent a borehole, which comprises a downhole instrument movably positioned in said borehole and including an acoustic pulse transmitter means generating and transmitting to said formations a train of acoustic pulses and concurrently generating a train of synchronizing pulses, said downhole instrument further including a plurality of acoustic energy receivers in fixed positions spaced longitudinally of the borehole from said transmitter means, equipment above ground including measuring means making acoustic velocity measurements responsive to signal outputs of said receivers, said measuring means including a plurality of input circuits, conductor means providing at least one conductor pair extending through the borehole and connecting said downhole instrument to said above ground equipment, said equipment including switch means above ground connecting said conductor pair in successive sequence to said input circuits of said measuring means, switch means in the downhole instrument responsive to said synchronizing pulses and independent of said above ground equipment connecting said receiver outputs in successive sequence to said conductor pair for transmission to the respective input circuits of said measuring means, and means for delaying the operation of said downhole switch means following each synchronizing pulse for a period of time sufficient to permit the measuring means to measure the output of the receiver connected to said conductor pair at the instant of generation of the synchronizing pulse.

2. The system defined by claim 1 wherein the number of input circuits to said measuring means is identical to the number of receivers in the downhole instrument.

3. The apparatus defined by claim 1 wherein the switch means in the downhole instrument includes an electromechanical relay together with means for operating said relay in response to each synchronizing pulse.

4. The apparatus defined by claim 1 wherein the switch means in the downhole instrument comprises a bi-stable multivibrator having a pair of electronic discharge devices, means connecting said synchronizing pulses to trigger said multivibrator from one stable state to the other, a first circuit including a relay and one of said devices and a second circuit including a dummy relay and the other of said devices, said relay being energized when said multivibrator is in one stable state and de-energized when said multivibrator is in its other stable state, a double-pole double-throw switch actuated by said relay, means connecting said receiver outputs to respective inputs of said double-pole double-throw switch, and means connecting the outputs of said double-pole double-throw switch to said conductor pair of transmission to said above ground equipment.

5. The apparatus defined by claim 1 wherein the switch means in the downhole instrument comprises a bi-stable multivibrator having a pair of electronic discharge devices each having an anode, means connecting said synchronizing pulses to trigger said multivibrator from one stable state to the other, a pentode associated with each said discharge device and having a suppressor grid and a control grid, means direct current coupling the anode of the respective discharge device to the suppressor grid of the respective pentode, means coupling the output of a respective receiver to a respective pentode control grid, bias means for rendering a respective pentode in condition for conduction when its associated discharge device is in the non-conductive state, a common output circuit for said pentodes, and means connecting said output circuit for transmission of said receiver outputs over said conductor pair to said above ground measuring equipment.

6. A system for measuring characteristics of earth formations adjacent a borehole, which comprises a downhole instrument movably positioned in said borehole and including an acoustic pulse transmitter means generating and transmitting to said formations a train of acoustic pulses and concurrently generating a train of synchronizing pulses, said downhole instrument further including a plurality of acuostic energy receivers located in different fixed positions spaced from said transmitter means, equipment above ground including measuring means having a plurality of input circuits, conductor means providing at least one conductor pair extending through the borehole and connecting said downhole instrument to said above ground equipment, said equipment including switch means above ground connection said conductor pair in successive sequence to said input circuits of said measuring means, switch means in the downhole instrument responsive to said synchronizing pulses and independent of said above ground equipment connecting the outputs of said receivers in successive sequence to said conductor pair for transmission to the respective input circuits of said measuring means, and means for delaying the operation of said downhole switch means following each synchronizing pulse for a period of time sufficient to permit the measuring means to measure the output of the receiver connected to said conductor pair at the instant of generation of the synchronizing pulse.

7. A system for measuring characteristics of earth formations adjacent a borehole, which comprises a downhole instrument movably positioned in said borehole and including an acoustic pulse transmitter means generating and transmitting to said formations a train of acoustic pulses and concurrently generating a train of synchronizing pulses, said downhole instrument further including a plurality of acoustic energy receivers mounted in different fixed positions spaced from said transmitter means, equipment above ground including measuring means having a plurality of input circuits, conductor means extending through the borehole and connecting said downhole instrument to said above ground equipment, said equipment including switch means above ground connecting said conductor means in successive sequence to said input circuits, switch means in the downhole instrument responsive to said synchronizing pulses and independent of said above ground equipment connecting the outputs of said receivers in successive sequence to said conductor means for transmission to the input circuits, and means for delaying the operation of said downhole switch means following each synchronizing pulse for a period of time sufficient to permit the measuring means to measure the output of the receiver connected to said conductor pair at the instant of generation of the synchronizing pulse.

8. The apparatus defined by claim 7 wherein the switch means in the downhole instrument includes an electromechanical relay together with means for operating said relay in response to each synchronizing pulse.

9. The apparatus defined by claim 7 wherein the switch means in the downhole instrument comprises a bi-stable multivibrator having a pair of electronic discharge devices, means connecting said synchronizing pulses to trigger said multivibrator from one stable state to the other, a first circuit including a relay and one of said devices and a second circuit including a dummy relay and the other of said devices, said relay being energized when said multivibrator is in one stable state and de-energized when said multivibrator is in its other stable state, a double-pole double-throw switch actuated by said relay, means connecting said receiver outputs to respective inputs of said double-pole double-throw switch, and means connecting the outputs of said double-pole double-throw switch to said conductor means for transmission to said above ground equipment.

10. The apparatus defined by claim 7 wherein the switch means in the downhole instrument comprises a bi-stable multivibrator having a pair of electronic discharge devices each having an anode, means connecting said synchronizing pulses to trigger said multivibrator from one stable state to the other, a pentode associated with each said discharge device and having a suppressor grid and a control grid, means direct current coupling the anode of the respective discharge device to the suppressor grid of the respective pentode, means coupling the output of a respective receiver to a respective pentode control grid, bias means for rendering a respective pentode in condition for conduction when its associated discharge device is in the non-conductive state, a common output circuit for said pentodes, and means connecting said output circuit for transmission of said receiver outputs over said conductor means to said above ground measuring equipment.

11. A system for measuring the acoustic velocity of earth formations adjacent a borehole, which comprises a downhole instrument movably positioned in said borehole and including an acoustic pulse transmitter means generating and transmitting to said formations a train of acoustic pulses and concurrently generating a train of synchronizing pulses, said downhole instrument further including first and second acoustic energy receivers mounted in different fixed positions spaced from said transmitter means and each receiving acoustic wave energy from each acoustic pulse after transmission through a portion of the borehole formations, equipment above ground connected to said downhole instrument via an electrical cable, said above ground equipment including a generator excited by said synchronizing pulses supplied thereto from the downhole instrument via said cable and generating a waveform that changes monotonically as a function of time following each synchronizing pulse, switch means in the above ground equipment connected to receive signals transmitted from the downhole instrument via said cable, a switch in the downhole instrument responsive to said synchronizing pulses and independent of said above ground equipment connecting the outputs of said receivers in alternate succession to said cable for transmission to the switch means in the above ground equipment, and means for delaying the operation of said downhole switch means following each synchronizing pulse for a period of time sufficient to permit the measuring means to measure the output of the receiver connected to said conductor pair at the instant of generation of the synchronizing pulse, first and second blocking oscillators connected in alternate succession by said switch means to said cable to respectively receive the output signals from said first and second receivers and to develop first and second control signals, respectively, in response to the first acoustic energy arriving at the respective receiver, first and second keyed double clamp circuits in said above ground equipment each responsive to the waveform from said generator and respectively responsive to said first and second control signals and each developing a D.C. signal proportional to the instantaneous magnitude of said waveform at the time of arrival of the first acoustic wave energy at the respective receiver, and said above ground equipment including measuring means responsive to the D.C. signals from both of said keyed double clamp circuits to develop acoustic velocity measurements as the downhole instrument is moved longitudinally through the borehole.

References Cited in the file of this patent

UNITED STATES PATENTS

| Re. 24,446 | Summers | Mar. 25, 1958 |
| 2,708,485 | Vogel | May 17, 1955 |
| 2,944,621 | Loofbourrow | July 12, 1960 |
| 2,949,973 | Broding et al. | Aug. 23, 1960 |
| 2,956,634 | Zemanek et al. | Oct. 18, 1960 |

UNITED STATES PATENT OFFICE
CERTIFICATE OF CORRECTION

March 26, 1963

Patent No. 3,082,837

Gerald C. Summers

It is hereby certified that error appears in the above numbered patent requiring correction and that the said Letters Patent should read as corrected below.

Column 10, line 36, for "of" read -- for --; line 69, for "connection" read -- connecting --.

Signed and sealed this 5th day of November 1963.

(SEAL)
Attest:

ERNEST W. SWIDER
Attesting Officer

EDWIN L. REYNOLDS

Acting Commissioner of Patents